UNITED STATES PATENT OFFICE.

JEAN BAPTISTE MARIE PROSPER CLOSSON, OF PARIS, FRANCE, ASSIGNOR TO SIDNEY GILCHRIST THOMAS, OF LONDON, ENGLAND.

MANUFACTURE OF MAGNESIA.

SPECIFICATION forming part of Letters Patent No. 266,970, dated November 7, 1882.

Application filed April 3, 1882. (No specimens.) Patented in France August 17, 1881, in Belgium September 2, 1881, in England September 3, 1881, in Germany September 8, 1881, and in Austria October 11, 1881.

*To all whom it may concern:*

Be it known that I, JEAN BAPTISTE MARIE PROSPER CLOSSON, a citizen of the Republic of France, residing at Paris, in the said Republic, have invented certain new and useful Improvements in the Manufacture of Magnesia; and I do hereby declare that the following is a full, clear, and exact description of the invention, which will enable others skilled in the art to which it appertains to make and use the same.

My invention relates to the manufacture of magnesia and its chloride from dolomite. Magnesia is now generally obtained by burning the rare and expensive mineral magnesite. I have before proposed to manufacture magnesia from solutions—such as the magnesium-chloride solution of Stassfurt, in which magnesia is present—by precipitation. By my present invention I produce a chloride of magnesium from which magnesia may be readily obtained by precipitation from dolomite and a solution of chloride of calcium. Dolomite is an exceedingly abundant and cheap material and chloride of calcium is a waste product in many chemical manufactures. My invention depends on the application of a reaction that takes place when carbonate of magnesia is treated with chloride of calcium.

In carrying out my invention I proceed as follows: I take dolomite (which consists of carbonate of magnesia and carbonate of lime in varying proportions) and burn it in an ordinary limekiln or other furnace, so as to expel the carbonic acid; or, which is preferable, I burn it only to about 600° (six hundred) Fahrenheit, in which case the carbonate of magnesia alone is decomposed, the carbonate of lime being unaffected. The calcined or partly-calcined material is then slaked to reduce it to powder, and then recarbonated by exposure to the action of carbonic acid. This recarbonating of the calcined dolomite is most cheaply effected by first exposing it to the action of the gases proceeding from limekilns, or to other gases highly charged with carbonic acid, and then completing the operation by suspending the partly-recarbonated dolomite in water and passing through it carbonic acid by an air-pump or blast-engine. The whole operation of recarbonating may be performed in the latter method; but it is more economical to recarbonate as far as possible in the dry way. Having obtained this artificially-recarbonated dolomite in a fine state of division, it is placed in a vat and digested with a solution of chloride of calcium. I have sometimes found it advantageous to form my artificial dolomite into little balls, blocks, or plates before placing it in the vat, so that a large surface may be exposed to the action of the chloride liquor. The solution of chloride of calcium may conveniently be of a strength of ten per cent. chloride of calcium, with ninety per cent. of water; but more or less dilute solutions may be used. The mixture in the vat is kept in a state of agitation by any suitable means, and is preferably heated to from 60° (sixty) to 80° (eighty) centigrade. The agitation is continued till the whole or nearly the whole of the carbonate of magnesia has been transformed into chloride of magnesium, with precipitation of a corresponding quantity of carbonate of lime. It is best always to have a little excess of chloride of calcium over the theoretical equivalent necessary for the conversion of all the carbonate of magnesia. If the digestion be performed in the cold and without agitation, it will take some days before it is complete. Instead of first calcining and then recarbonating the dolomite, unburned dolomite may be used directly; but here, also, the operation is more tedious and the reaction less complete. From the vat in which the reaction above described has taken place, after giving time for all the carbonate of lime to settle to the bottom, I carefully draw off the liquid, consisting of chloride of magnesium with a little chloride of calcium. This liquid is heated with calcined dolomite or ordinary burned lime, the quantity of the latter being sufficient to give fifty-six pounds of lime for every twenty-four (24) parts of magnesium present in the magnesium-chloride solution. The whole of the magnesia, being thus precipitated as hydrate, after calcining, is ready for use, while the chloride-of-calcium solution can be used again in the vats in treating a fresh quantity of dolomite.

The carbonate of lime forming the residue in the vats is another merchantable product.

I do not claim the mere treatment of magnesium-chloride solution, however, produced with calcined dolomite or lime.

Having thus described my invention, I would have it understood that I do not claim the mere manufacture of magnesia by precipitating it from its solutions by lime; but

What I do claim is—

1. The process of manufacturing magnesium chloride by heating crude or artificially-recarbonated dolomite with chloride-of-calcium solution, substantially as set forth.

2. The process of manufacturing magnesia, consisting of treating crude or artificially-recarbonated dolomite by digesting it with a solution of chloride of calcium and treating the resulting solution of chloride of magnesium by heating it with calcined dolomite or ordinary burned lime, substantially as herein described.

JEAN BAPTE. MARIE PROSPER CLOSSON.

In presence of—
   JULES PROUST,
   E. CHÉRIÈRE.